(12) United States Patent
Hariharasubrahmanian

(10) Patent No.: US 7,197,046 B1
(45) Date of Patent: Mar. 27, 2007

(54) SYSTEMS AND METHODS FOR COMBINED PROTOCOL PROCESSING PROTOCOLS

(76) Inventor: Shrikumar Hariharasubrahmanian, 1381 South East St., Amherst, MA (US) 01062

( * ) Notice: Subject to any disclaimer, the term of this patent is extended or adjusted under 35 U.S.C. 154(b) by 500 days.

(21) Appl. No.: 09/649,088

(22) Filed: Aug. 7, 2000

(51) Int. Cl.
*H04J 3/16* (2006.01)

(52) U.S. Cl. .................. 370/466; 370/469; 370/474; 370/471

(58) Field of Classification Search ............... 370/466, 370/467, 469, 474, 471
See application file for complete search history.

(56) References Cited

U.S. PATENT DOCUMENTS

| | | | |
|---|---|---|---|
| 5,778,189 A * | 7/1998 | Kimura et al. ............... 709/236 |
| 5,953,340 A * | 9/1999 | Scott et al. .................. 370/401 |
| 6,041,054 A * | 3/2000 | Westberg .................... 370/389 |
| 6,172,990 B1 * | 1/2001 | Deb et al. .................... 370/474 |
| 6,400,730 B1 * | 6/2002 | Latif et al. ................... 370/466 |
| 6,438,137 B1 * | 8/2002 | Turner et al. ............... 370/466 |
| 6,580,717 B1 * | 6/2003 | Higuchi et al. .............. 370/401 |
| 6,590,903 B1 * | 7/2003 | Hofers et al. ............... 370/466 |
| 6,594,278 B1 * | 7/2003 | Baroudi ....................... 370/466 |
| 6,625,147 B1 * | 9/2003 | Yokoyama et al. ......... 370/389 |
| 6,639,917 B1 * | 10/2003 | Ellington et al. ........... 370/401 |
| 6,697,354 B1 * | 2/2004 | Borella et al. .............. 370/352 |
| 6,711,743 B1 * | 3/2004 | Hong et al. ................. 725/111 |
| 6,731,632 B1 * | 5/2004 | Takahashi et al. .......... 370/392 |
| 6,963,582 B1 * | 11/2005 | Xu .............................. 370/466 |

OTHER PUBLICATIONS

Brian Brown, "Open Systems Interconnect (OSI) Model", "Data Communications", http://www.coltec.ufmg.br/n2m/comunica/dc, 1999.*

* cited by examiner

*Primary Examiner*—Doris H. To
*Assistant Examiner*—Steve Blount
(74) *Attorney, Agent, or Firm*—Cesari & McKenna, LLP

(57) ABSTRACT

Methods and systems for processing data packets enable a communication device having limited memory to participate in network protocols. One communicating device formats packets in accordance with the specifications of one or two or more communication protocols, with one or more additional constraints, and transmits it to an other communication device. The other communication device performs a specified processing of the received packet to generate a reply packet in response to the received packet, which conforms to the one of two or more communication protocols, while also satisfying one or more additional formatting constraints.

6 Claims, 7 Drawing Sheets

| SOURCE PORT | DESTINATION PORT | | | |
|---|---|---|---|---|
| SEQUENCE NUMBER | | | | |
| ACKNOWLEDGE NUMBER | | | | |
| HEADER LENGTH | RESERVED | FLAGS | WINDOW | |
| CHECKSUM | | | URGENT POINTER | |

| VERSION | HL | TYPE OF SERVICE | TOTAL LENGTH | |
|---|---|---|---|---|
| IDENTIFICATION | | | FLAGS | FRAGMENT OFFSET |
| TIME TO LIVE | | PROTOCOL | HEADER CHECKSUM | |
| SOURCE ADDRESS | | | | |
| DESTINATION ADDRESS | | | | |

FIG. 5

SYSTEMS AND METHODS FOR COMBINED PROTOCOL PROCESSING PROTOCOLS

FIELD OF THE INVENTION

The present invention relates generally to data communication and, more particularly, to systems and methods used to process and respond to data packets according to different protocols.

BACKGROUND OF THE INVENTION

Communication networks permit communication devices, such as personal computers, servers, laptops, personal digital assistants (PDAs), and other similar devices, to communicate with one another. Recently, household appliances have begun including micro-controllers and/or microcomputers that allow these appliances to communicate over a communication network, such as the Internet.

Communication over these networks in often goverened by a packetization protocol and a corresponding packet exchange protocol that specifies what the communication devices must or must not do under specific circumstances. These protocols are often defined according to a layered architecture. These protocols are defined under the relevant standards, as applicable to the domains in which the communication devices operate.

Packetization and packet exchange protocols usually require that a communication device involved in data communications transmit a data file as a series of discrete packets. Such packetization is govered by the protocols specified as a part of the transport layer protocols. For example, the stream of one or more packets may be govered by protocols such as Transmission Control Protocol (TCP) or the User Datagram Protocol (UDP) and all related protocols, as specified in "Requirements for Internet Hosts—Communication Layers," RFC1122, ftp://ftp.isi.edu/in-notes/rfc1122.txt, October 1989. The packets produced in accordance with these protocols are transmitted in accordance with the procedures of the network layer and data link layer protocols.

The packet format specified by the Transmission Control Protocol and the User Datagram Protocol are different. The procedures specified in the Transmisson Control Protocol (TCP) and User Datagram Protocol (UDP) for processing the information in the headers of these packets and for replying to the packets are different. In the conventional implementations, the procedures in accordance with these protocols are implemented using distinct systems and/or distinct methods.

Some communication devices, such as mini-computers, micro-controllers, and microcomputers, lack sufficient local memory to store the information associated with the procedures in these protocols. Some of these devices lack the memory resources to store the instructions for the distinct processing of distinct packetization protocols. Some of these devices lack the logic circuit resources to perform the distinct processing requirements of these distinct protocols.

Therefore, there exists a need for systems and methods that enable communication devices with limited memory capacity or logic circuitry to communicate over a network with one or more distinct protocols.

SUMMARY OF THE INVENTION

Systems and methods consistent with the present invention address this and other needs by enabling a communication device to transmit data packets in accordance with two or more distinct protocols without requiring a large local memory to store the two or more distinct processing instructions and without requiring a large logic circuitry to contain the two or more distinct processing means.

In accordance with the purpose of the invention as embodied and broadly described herein, a method of transmitting data in accordance with one of two or more protocol specifications and in accordance with one of two or more packet formatting specifications is provided. The method includes requiring the data fields of a data packet to be formatted in accordance with one or more additional constraints, over and above the constraints as specified in the protocol specification corresponding to this packet. The method also includes a method for deriving and specifying these additional one or more constraining specifications that are to be applied to the formatting of the packets.

In another implementation consistent with the present invention, a system for transmitting data in a network is provided. The data includes one or more segments transmitted in separate packets. The system includes a memory configured to store instructions and a processor configured to execute the instructions. The instructions cause the processor to generate a data packet in accordance with one protocol, with some additional constraints on its formatting as specified by additional instructions that are also a part of the system.

In yet another implementation consistent with the present invention, a computer-readable medium that stores instructions executable by one or more processors is provided. The instructions cause the processor to generate a data packet in accordance with one protocol, with some additional constraints on its formatting as specified by additional instructions that are also stored in the computer-readable medium.

In still another implementation consistent with the present invention, a method is provided for formatting a UDP packet with additional constraints and an additional pseudo-header field within the data payload field of the UDP packet.

In a further implementation consistent with the present invention, a device for transmitting one or more data packets is provided. The device includes logic configured to generate packets for transmission, such that the packets are in accordance with the specifications of one protocol and are also in accordance with one or more additional constraints imposed by the teachings of this invention upon the design of the device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 illustrates an exemplary structure of a Transmission Control Protocol (TCP) packet header; and FIG. 5 illustrates an exemplary structure of a Internet Protocol (IP) packet header.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention permit communication devices of limited capabilities, such as those with very restricted memory resources that are unable to store the large number of instructions, or that are unable to contain the large logic circuitry, required for peforming procedures in accordance with two or more protocols, to process and respond to packets in accordance with network protocols. The communication devices may accomplish this feat by using the same set of instructions or the same logic circuitry to perform the procedures in accordance with two or more distinct protocols. The network peers may facilitate this by formatting the packets generated in accordance with one protocol subject to one or more additional formatting constraints according to this invention.

Exemplary Network

Figure 1:
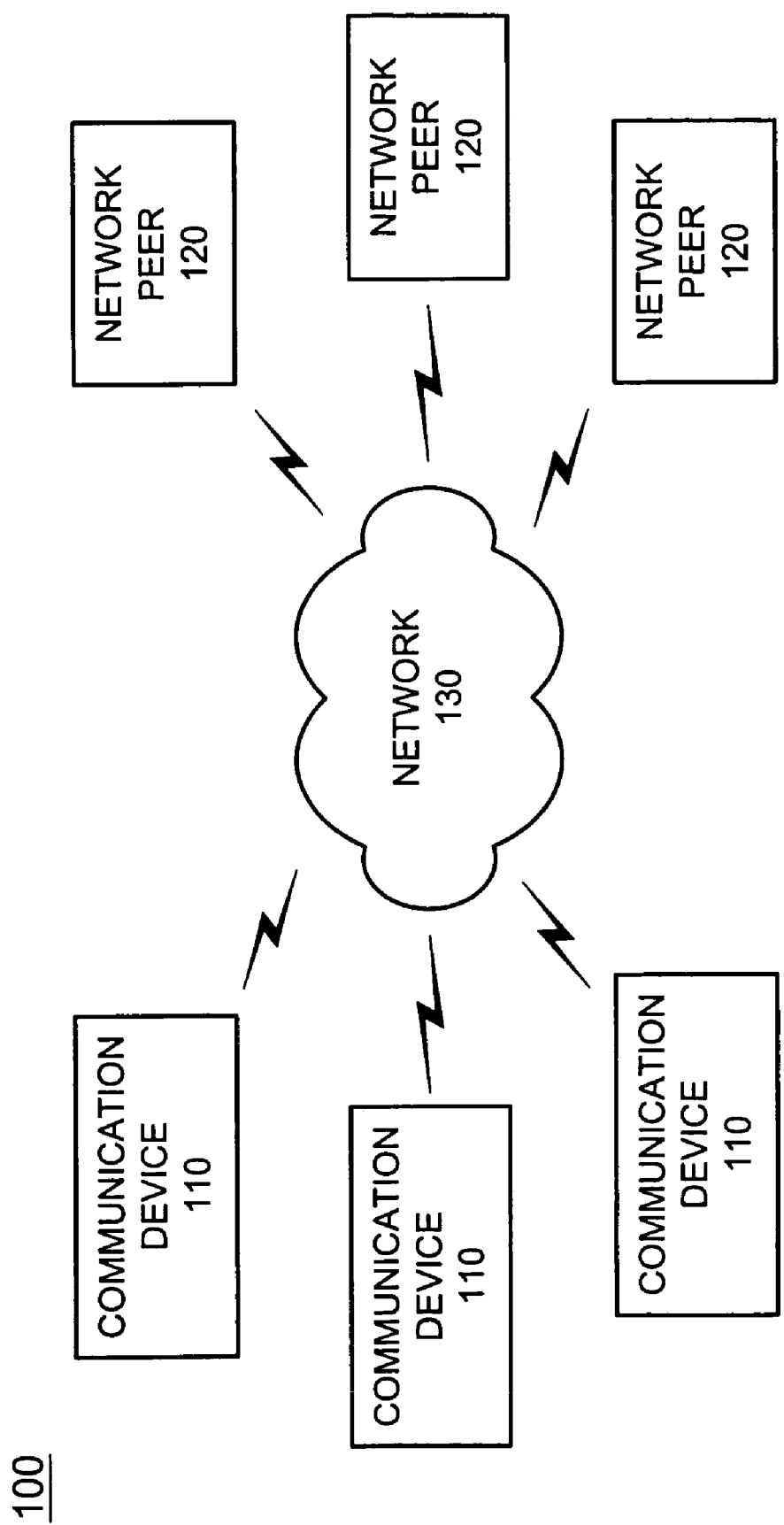
FIG. 1 illustrates an exemplary network in which systems and methods consistent with the present invention may be implemented.

FIG. 1 is an exemplary network 100 in which systems and methods consistent with the present invention may be implemented. The network 100 may include communication devices 110 and may also include network peers 120 connected to a communication network 130. Three communication devices 110 and three network peers 120 have been shown in FIG. 1 for simplicity. In practice, the network 100 may include more or less communication devices 110 and more or less network peers 120.

It should be noted that a communication device 110 may perform the role of a network peer 120 at various times in the same conversation or different conversations and vice versa. In other words, communication devices 110 may perform the functions described below as being performed by network peers 120. Similarly, network peers 120 may perform the functions described as being performed by the communication devices 110.

The network 130 may include one or more data communication networks, such as the Internet, an intranet, a wide area network (WAN), a local area network (LAN), or the like. In one implementation consistent with the present invention, the network 130 includes a packet-based network that operates according to a communications protocol, such as Transmission Control Protocol (TCP), User Datagram Protocol (UDP) and all related protocols, as specified in "Requirements for Internet Hosts—Communication Layers," RFC1122, ftp://ftp.isi.edu/in-notes/rfc1122.txt, October 1989. Each of the communication devices 110 or network peers 120 may include a computer device, such as a personal computer, server, laptop, personal digital assistant (PDA), etc., a computer system, such as a system or logic on a chip, an electronic device, or a similar device with or without extensive computational and/or memory resources. The communication devices 110 or network peers 120 may connect to the network 130 via wired, wireless or optical communication paths. In one implementation consistent with the present invention, the communication devices 110 or network peers 120 connect to the network 130 using a data link protocol, such as the Serial Line Internet Protocol (SLIP), Ethernet, or Token Ring. The communication devices 110 or network peers 120 may communicate over the network 130 via a virtual circuit, connection or socket.

Figure 2:
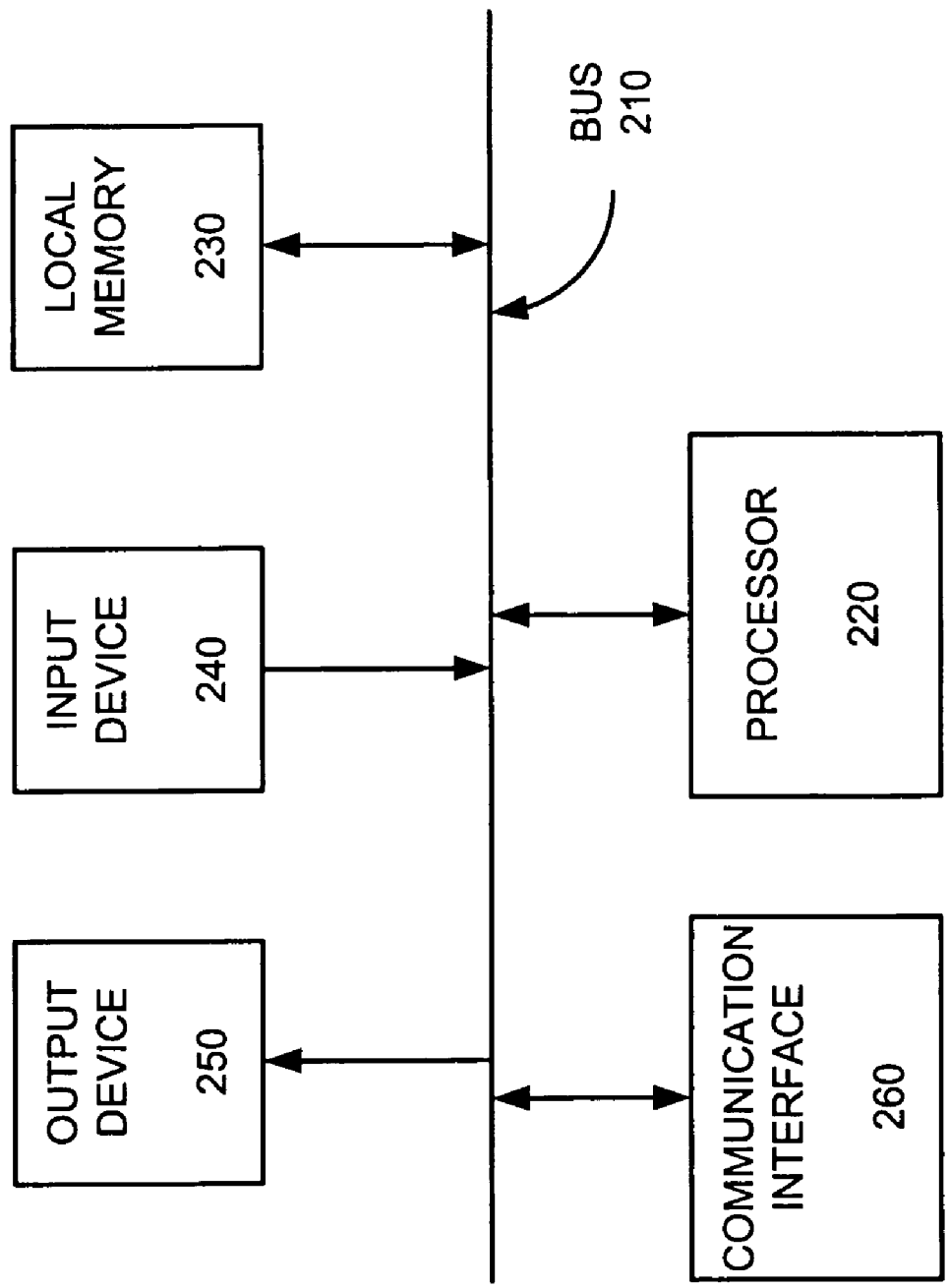
FIG. 2 illustrates an exemplary configuration of a communication device and network peer of FIG. 1 in an implementation consistent with the present invention.

FIG. 2 is an exemplary diagram of components of a communication device 110 or network peer 120 in an implementation consistent with the present invention. The communication device 110 may include a bus 210, a processor 220, a local memory 230, an input device 240, an output device 250, and a communication interface 260. The bus 210 may include one or more busses or conductors that connect together one or more of the components of the communication device 110. The processor 220 may be any type of conventional processor or microprocessor that interprets and executes instructions.

The local memory 230 may be a large or small capacity computer-readable medium that stores information and instructions for use by the processor 220. A computer-readable medium may include one or more memory devices, such as a random access memory (RAM), a read only memory (ROM), or another type of dynamic or static storage device, and/or carrier waves. In one implementation consistent with the present invention, the local memory 230 includes a small capacity memory device capable of storing a small amount of information, less than the information typically included in a packet or in a set of packets.

The input device 240 may include any conventional mechanism that permits a user to input information into the communication device 110, such as a keyboard, a key pad, a mouse, a microphone, a data acquisition device, a sensor, etc. The output device 250 may include any conventional mechanism that outputs information to the user, including a display, a speaker, a transducer, an actuator, etc. The communication interface 260 may include any transceiver-like mechanism that enables the communication device 110 to communicate with the other devices and systems. For example, the communication interface 260 may include mechanisms for communicating via a network, such as a network 130.

As will be described in detail below, a communication device 110 or network peer 120, consistent with the present invention, that contains insufficient resources to perform the necessary data packetization and transport protocol procedures in accordance with two or more protocol specifications may communicate over a network, such as network 130, that requires and/or mandates the use of such protocols and respond to packets transmitted in accordance with any one of two or more protocols. The communication device 110 or network peer 120 may perform these tasks in response to processor 220 executing sequences of instructions contained in a computer-readable medium, such as the local memory 230.

The instructions may be read into local memory 230 for another computer-readable medium or from another device via the communication interface 260. Execution of the sequences of instructions contained in local memory 230 causes processor 220 to perform processes that will be described later. Alternatively, hardwired circuitry may be used in place of or in combination with software instructions to implement processes consistent with the present invention. For example, the components of the communication device 110 may be fully implemented in silicon via a combination of logic gates. Thus, the present invention is not limited to any specific combination of hardware circuitry and software.

Exemplary Communication Protocol

Figure 3:
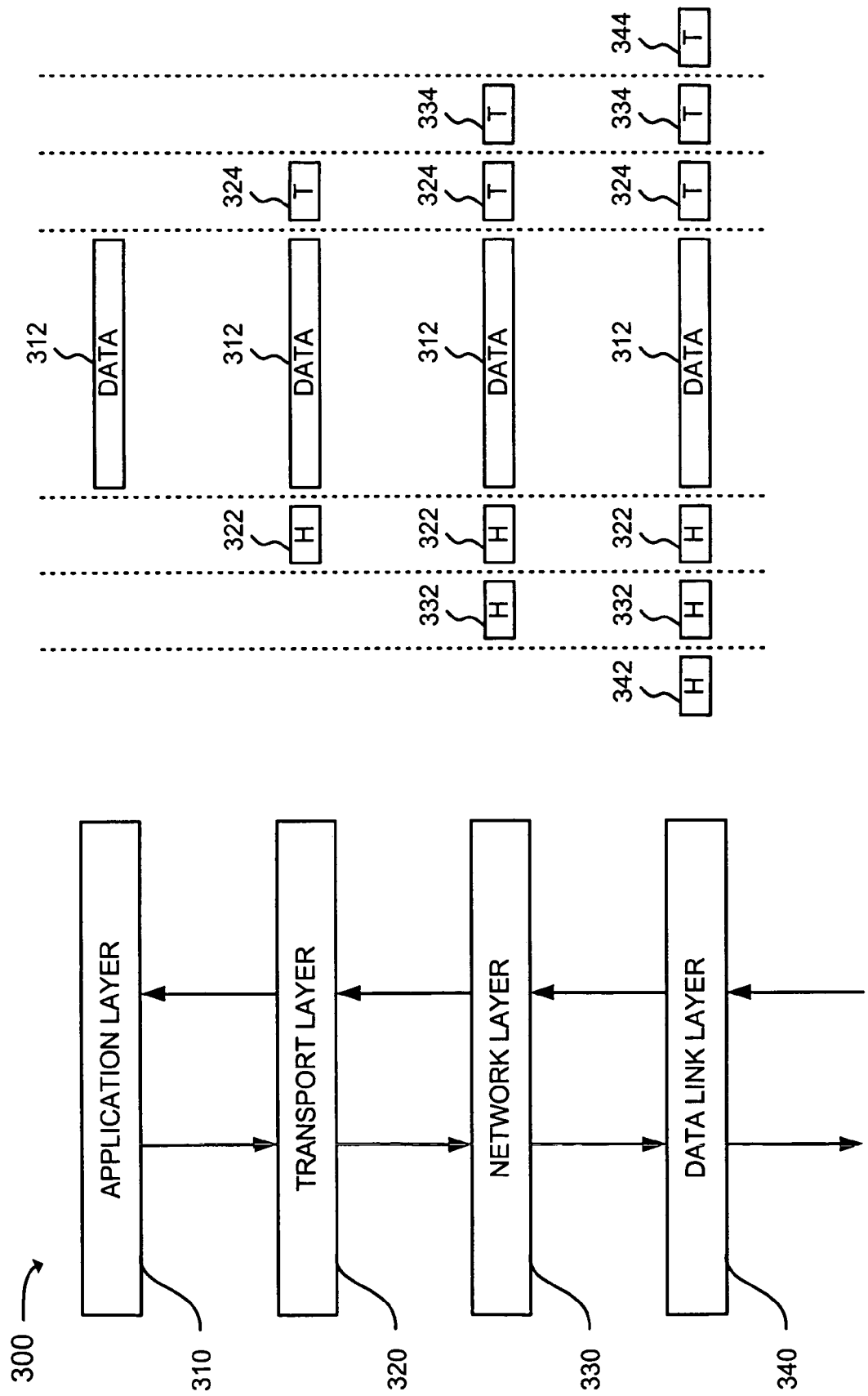
FIG. 3 illustrates exemplary diagram of a communications protocol used by a communication device or network peer of FIG. 1 in an implementation consistent with the present invention.

FIG. 3 is an exemplary diagram of a communications protocol 300 used by a communications device 110 in an implementation consistent with the present invention. The communications protocol 300 includes an application layer 310, a transport layer 320, a network layer 330, and a data link layer 340. The application layer 310 may include the applications or programs that initiate the communication. The application layer 310 may include several application layer protocols for mail, file transfer, remote access, authentication, and name resolution. The application layer 310 may deliver data 312 to the communication network by passing data of a packet to the transport layer 320 along with the socket of the destination packet.

The transport layer 320 may establish a virtual circuit, a connection, or a socket between the source and the destination of the packet. Further, the transport layer 320 may break the packet 312 from the application layer 310 into one or more packets, or segments. The transport layer 320 may attach a header 322 and trailer 324 onto the data field containing the packet 312, or a packet from 326, in accordance with the specifications of the relavant transport protocol. For example, the header 322 and trailer 324 may be in accordance with Transmission Control Protocol (TCP). As a further example, the header 322 and trailer 324 may be in accordance with the User Datagram Protocol (UDP). The transport layer 320 passes the packet to the network layer 330 along with the IP address of the destination. The network layer 330 may accept the packet from the transport layer 320 and prepare the packet for the data link layer 340 by converting the IP address into a physical address, such as a Media Access Control (MAC) address. The network layer 330 may fragmenting the packet if necessary into the required sizes, to create one or more packets, or fragments. The network layer 330 may generate packets called datagrams by attaching, to the data field, an IP header 332 and trailer 334 onto the packets from the transport layer 320 in accordance with the specifications of the relavant protocol. For example, this header 332 and trailer 334 may be in accordance with the Internet Protocol. Further, the header 332 and trailer 334 may be in accordance with some other protocol. The network layer 330 passes the datagram to the data link layer 340.

The data link layer 340 may include a data link protocol, such as Ethernet, Token Ring, Asynchronous Transfer Mode (ATM), Fiber Distributed Data Interface (FDDI), Synchronous Optical Network (SONET), or X.25, that is responsible for reliably moving the data across the communications network 130. The data link layer 340 might fragment the packet into one or more data link packets, if necessary. The data link layer 340 converts the datagram into its own format, which may include adding, to the data field, a header 342 that includes source and destination MAC addresses and a trailer 344 that includes checksum data. The header 342 and trailer 344 may be in accordance with any one or any other datalink protocol.

Four layers have been shown in FIG. 3 for simplicity. In practice, the communication device may have more or less number of layers than as shown in FIG. 3.

FIGS. 4–7 are detailed diagrams of the headers 322–342, respectively, in an implementation consistent with the present invention. As shown in FIG. 4, the header 322 in accordance with Transmission Control Protocol (TCP) includes a source port field, a destination port field, a sequence number field, an acknowledge number field, a header length field, a flags field, a window field, a checksum field, and an urgent pointer field. The source port and destination port fields include data that identify the source and destination of a data packet. The sequence number field includes data used to assure the order and delivery of the packet at the destination. The acknowledge field includes data that identifies the next byte of the data that the source expects to receive from the destination.

The header length field includes data that identifies the length of the header 322. The reserved field may be used for future expansions. The flags field may include several flags, such as urgent, acknowledge, push, reset, synchronize, and finish flags. The urgent flag indicates whether the data in the urgent pointer field is valid. The acknowledge flag indicates whether the data in the acknowledgement number field is valid. The push flag indicates whether the accompanying data should be passed on to the application at the destination in an expedited manner. The reset flag indicates whether the connection should be reset. The synchronize flag is used to establish an initial agreement on the sequence numbers. The finish flag indicates whether the source has finished sending data.

The window field includes data that identifies the amount of space the destination has available for storage of unacknowledged data. The checksum field includes a checksum value that may cover both the header 322 and the data 312. The urgent pointer field includes data that identifies whether this packet should take priority over the normal data stream.

Referring to FIG. 5, the header 332 formatted according to the Internet Protocol includes a version field, a header length field, a type of service field, a total length field, an identification field, a flags field, a fragment offset field, a time to live field, a protocol field, a header checksum field, a source address, and a destination address. The version field includes data that identifies the version of the protocol being used. The header length field includes data that identifies the length of the header 332. The type of service field includes data that identifies the quality of service to be given to the datagram by the network 320.

The total length field includes data that identifies the length of the datagram (i.e., the headers 322 and 332 and data 312). The identification field includes data used to reassemble a fragmented datagram at the destination. The flags field may include one or more flags that identify, for example, whether the datagram may be fragmented. The fragment offset field includes data that identifies the starting point in relation to the start of the original sent packet.

The time to live field includes a count value that identifies the number of hops/links over which the packet may be routed. The protocol field includes data that identifies the type of transport protocol (e.g., Internet Control Message Protocol (ICMP), Internet Group Managament Protocol (IGMP), Transmission Control protocol or User Datagram Protocol (UDP)) to be used on the datagram at the destination. The header checksum field includes a checksum value that covers the header 332. The source and destination fields include addresses, such as Internet addresses, of the source and destination respectively.

Figure 6:
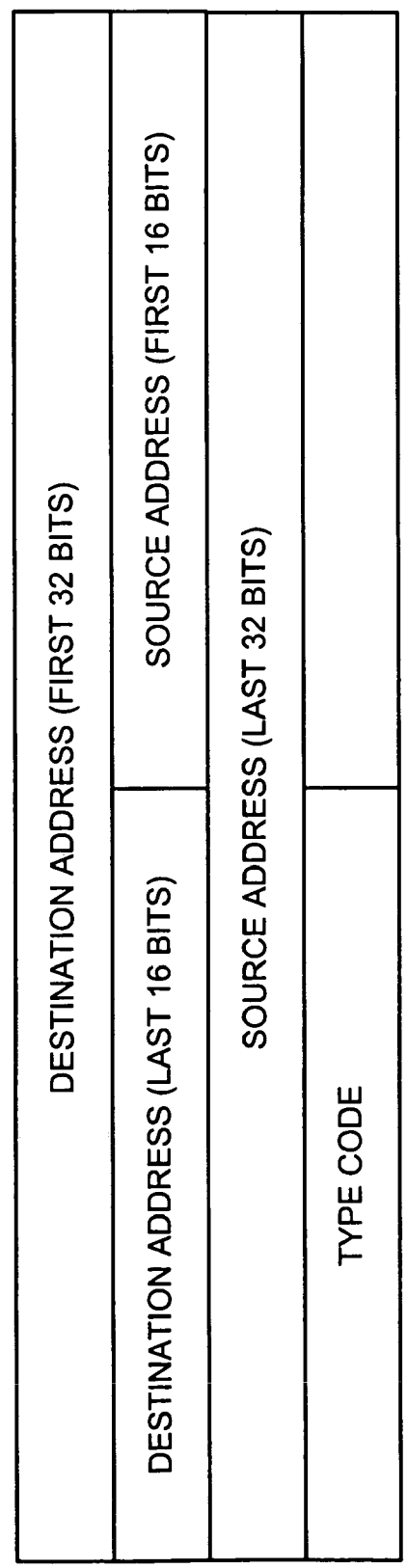
FIG. 6 illustrates an exemplary structure of a Data Link Protocol packet header.

Referring to FIG. 6, the header 342 includes a destination address field, a source address field and a type code field. The source and destination address fields include addresses such as Ethernet addresses, for the source and destination, respectively. The type code field includes data that identifies the data link protocol used to connect the source and destination.

Figure 7:
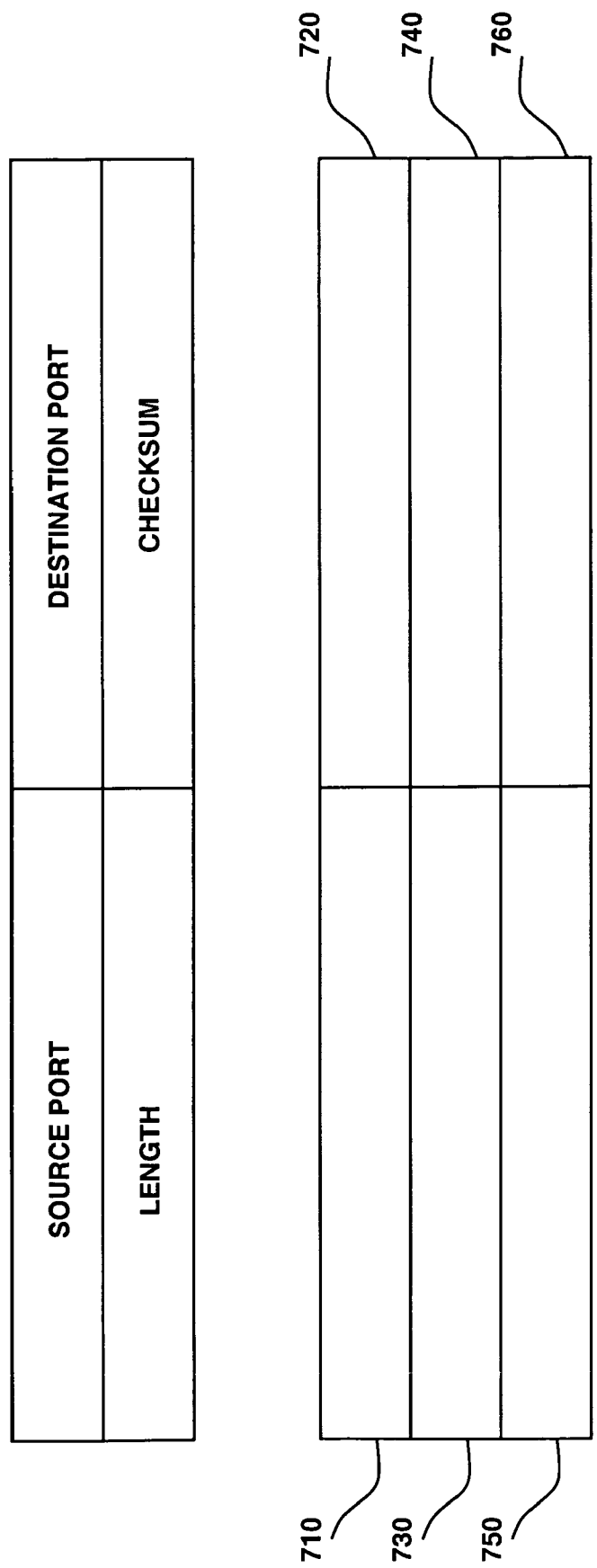
FIG. 7 illustrates an exemplary structure of a User Datagram Protocols (UDP) packet, formatted in accordance with the teachings of the present invention.

Now referring to FIG. 7, the header 322 in accordance with User Datagram Protocol (UDP) includes a source port field, a destination port field, a datagram length field, and a checksum field. The source port and destination port fields include data that identify the source and destination of a data packet. The datagram length field includes data that specifies the lenght of the UDP datagram. The checksum field contains data that is used to assure the validity of the data contained in the packet. The data field follows the header field. Consistent with the elements of present invention, the data field may be constrained to carry a pseudo-header field.

Exemplary Processing

A communication device 110 or a network peer 120 consistent with the present invention, may transmit packets formatted to be in accordance with any one of two or more protocols. As an example, a packet may be transmitted to be in accordance with TCP. As a further example, a packet may be transmitted to be in accordance with UDP. Further, in accordance with the principles consistent with the present invention, the packet may be formatted according one or more additional formatting constraints.

For example, the UDP packet may be constrained to carry a pseudo-header field. One exemplary pseudo-header field is depicted in FIG. 7. FIG. 7 shows a pseudo-header containing 6 sub-fields, 710, 720, 730, 740, 750 and 760. These fields may be generated for transmission with constraints additional to the constraints of the UDP protocol. For example, the fields may be constrained as follows:

Pseudo-Header field 710 is assigned a value consistent with the expected length of the reply UDP packet that would be generated by the destination device in reply to this packet;

Pseudo-Header field 720 is assigned the value 0x00 0x00;

Pseudo-Header field 730 is assigned the value hexadecimal 0x00 0x10;

Pseudo-Header field 740 is assigned an arbitrary value;

Pseudo-Header field 750 is assigned a value derived by calculating a checksum of the packet in accordance with the TCP checksum algorithm, by interpretting the packet that is formatted in accordance with the UDP protocol using the packet format specified by the TCP protocol;

Pseudo-Header field 760 is assigned an arbitrary value.

Consistent with the teachings of this invention, when a packet is received by a communication device 110 or network peer 120, it performs the procedures relavant to the appropriate protocol as indicated by the protocol type field in the header which specifies the formatting rules applicable to this packet. Additionally, consistent with the teachings of this invention, the communication device 110 or network peer 120 would process the pseudo-header according to one or more additional formatting rules. For example, the packet may be specified as a UDP packet. The communication device 110 or network peer 120 receiving it may accept the packet in accordance with the UDP procedures. Subsequently it may extract the pseudo-header from the data field of the UDP packet, and perform the following procedures:

Pseudo-header field 710 may be compared with the UDP length field originally transmitted;

Pseudo-header field 720 may be compared with a value derived from a computation on the UDP checksum field orginally transmitted;

Pseudo-header field 730 may be compared with a value of hexadecimal 0x00 0x18 or 0x00 0x19;

Pseudo-header field 740 may be ignored;

Pseudo-header field 750 may be compared with the result of a computation involving the checksum of the packet computed according to the UDP procedures and the checksum of the packet computed according to TCP procedures;

Pseudo-header field 760 may be ignored;

In addition to the above, in accordance with the teachings of the present invention, some elements of the application layer 310 using the transport connection may be arranged to have certain properties constraining their design and selection in a manner that it facilitates this invention. As an example, the application layer protocol may be modified or altered to allow the application layer protocol to ignore a speficied number of octets of data field which are reserved for use for the pseudo-header.

It should be noted that the present invention is not limited to TCP and UDP protocols, and may be applied to any set of two or more protocols. Further, the present invention may be applied to any packetization procedures at any or all of the layers of the protocols. Also, the present invention may be applied to any or all packetization protocols that are part of an architecture that use more or less number of layers.

Further, hardwired circuitry may be used in place of or in combination with software instructions to implement processes consistent with the present invention. For example, the functions performed by the components of the communication device 110 or the network peer 120 may be fully or partially implemented via a combination of logica gates formed in silicon. Thus, the present invention is not limited to any specific combination of hardware circuitry and software.

The scope of the invention is defined by the following claims and their equivalents.

What is claimed is:

1. A method of analyzing the header of one protocol in the context of the header of at least one other protocol, the method comprising:

identifying the prefix portion of the header of the one protocol that is common with the corresponding prefix portion of the at least one other protocol; and identifying a next portion of the header of the one protocol that differs from the corresponding next portion of the header of the at least one other protocol; and computing at least one constraint that is to be applied to the processes which can generate packets in accordance with the at least one other protocol without requiring additional memory storage resources.

2. The method of claim 1, wherein the computing of the at least one constraint is done so that the packet generated in accordance with the at least one other protocol with the further addition of the at least one constraint will satisfy the requirements of the one protocol.

3. The method of claim 2, wherein the computing of the at least one constraint is done so that the packet generated in accordance with the at least one other protocol with the further addition of the at least one constraint will substantially satisfy the requirements of the one protocol.

4. A system for analyzing the header of one protocol in the context of the header of at least one other protocol, the method comprising:

means for identifying a prefix portion of the header of the one protocol that is common with a corresponding prefix portion of the at least one other protocol; and means for identifying a next portion of the header of the one protocol that differs from a corresponding next portion of the header of the at least one other protocol; and means for computing at least one constraint that is to be applied to processes having means for generating packets in accordance with the at least one other protocol without requiring additional memory storage resources.

5. The system for analyzing the header of one protocol in the context of the header of at least one other protocol as defined in claim 4 wherein said means for computing at least one constraint includes means for generating packets in accordance with the at least one other protocol with the further addition that the at least one constraint will satisfy the requirements of the one protocol.

6. The system for analyzing the header of one protocol in the context of the header of at least on other protocol as defined in claim 4 wherein said means for computing at least one constraint includes means for generating packets in accordance with the at least one other protocol with the further addition of the at least one constraint will substantially satisfy the requirements of the one protocol.

* * * * *